No. 821,857. PATENTED MAY 29, 1906.
H. H. CHESBROUGH.
TIME EGG BOILER.
APPLICATION FILED SEPT. 15, 1905.
2 SHEETS—SHEET 1.
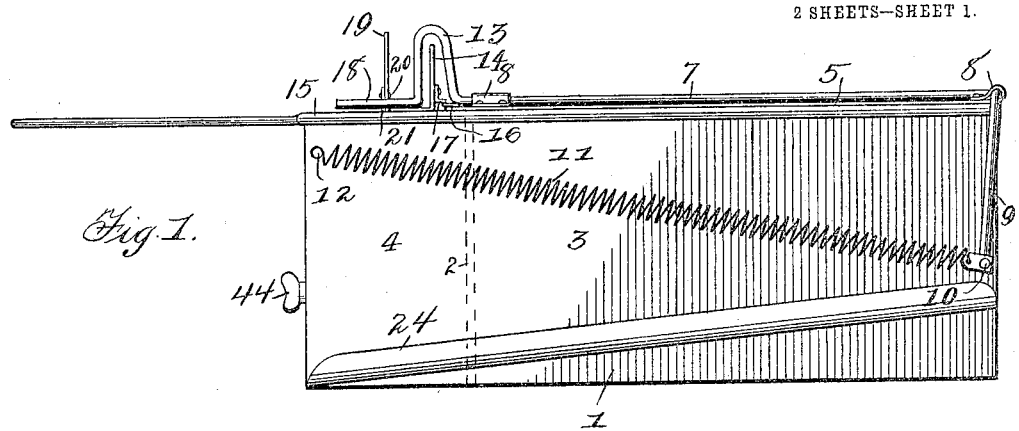
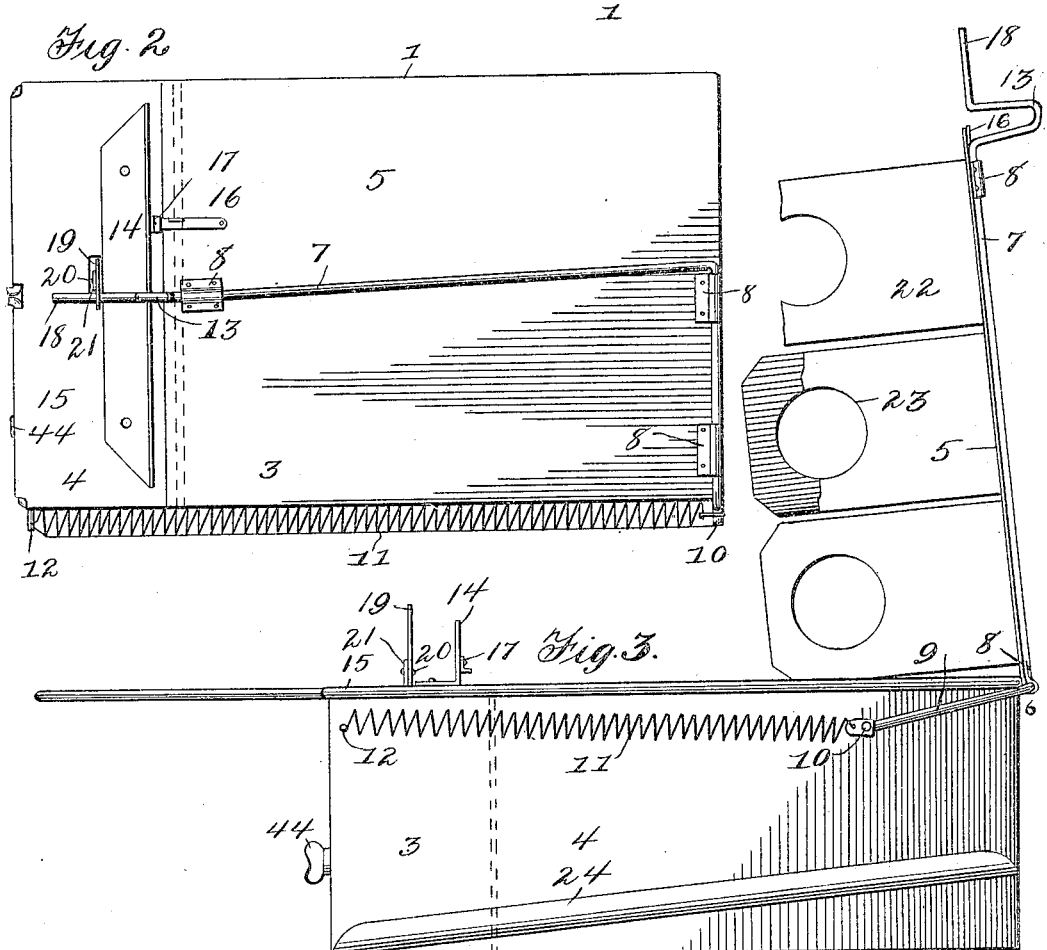
Witnesses
J. P. Mawhinney
J. B. Connolly
Inventor
Horace H. Chesbrough
By H. C. Evert & Co. Attorneys No. 821,857. PATENTED MAY 29, 1906.
H. H. CHESBROUGH.
TIME EGG BOILER.
APPLICATION FILED SEPT. 15, 1905.
2 SHEETS—SHEET 2.
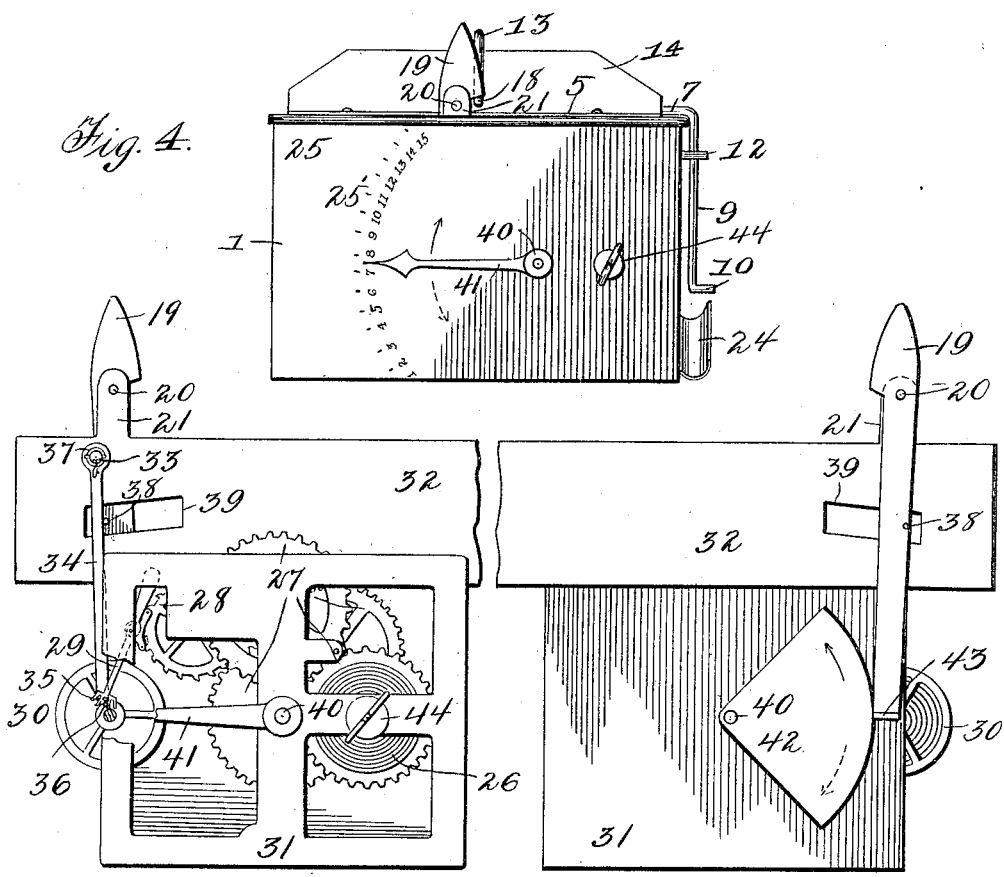
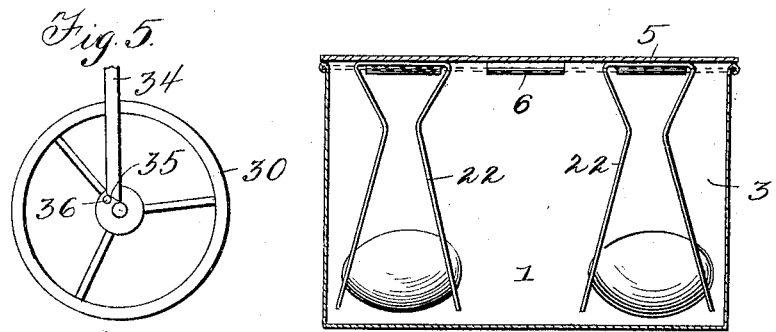
Witnesses
Inventor
Horace H Chesbrough
By H.C. Evert & Co. Attorneys

UNITED STATES PATENT OFFICE.

HORACE HASTINGS CHESBROUGH, OF SOUTHPARK, WASHINGTON.

TIME EGG-BOILER.

No. 821,857.　　　Specification of Letters Patent.　　　Patented May 29, 1906.

Application filed September 15, 1905. Serial No. 278,588.

*To all whom it may concern:*

Be it known that I, HORACE HASTINGS CHESBROUGH, a citizen of the United States of America, residing at Southpark, in the county of King and State of Washington, have invented certain new and useful Improvements in Egg-Boilers, of which the following is a specification, reference being had therein to the accompanying drawings.

This invention has relation to egg-boilers, and has for its object the provision of a novel apparatus which will serve to hold the eggs in the boiling water for certain predetermined intervals of time and then automatically raise them out of the boiling water and sustain them in a position where they may be readily removed from the apparatus when desired.

In carrying my present invention into effect I provide a receptacle adapted to contain water and to contain the eggs to be boiled in the water, this receptacle being provided with a hinged lid, which lid carries egg-holders and which is spring-actuated, so as to open automatically and lift the eggs out of the water when it is released by the action of a retaining-latch, the operation of which latch is governed by a clockwork mechanism carried by the aforesaid receptacle and provided with means whereby the latch will be released after the clockwork mechanism has operated for a predetermined interval of time, the period of time being variable at will.

I have illustrated my invention in the accompanying drawings, in the several figures of which like numerals designate corresponding parts, and in which—

Figure 1 is a side elevation of the apparatus with the lid of the receptacle closed. Fig. 2 is a top plan view of the same. Fig. 3 is a side elevation with the lid of the receptacle open. Fig. 4 is an end elevation with the lid of the receptacle closed and secured in closed position by the clockwork-actuated latch. Fig. 5 is a front elevation of the clockwork mechanism and the latch detached from the receptacle and shown on an enlarged scale. Fig. 6 is an elevation of the same, taken from the opposite side to that on which Fig. 5 is taken. Fig. 7 is a vertical sectional view taken through the center of the receptacle shown in Figs. 1 to 4 and showing the egg-holders carried by the hinged lid thereof. Fig. 8 is a detail view, on an enlarged scale, of the balance-wheel and a portion of the appurtenant parts of the latch shown in Fig. 5.

In Figs. 1 to 4 and in Fig. 7 1 designates a receptacle which is preferably of substantially rectangular form and is divided by a partition 2 (shown in dotted lines in Figs. 1 and 3) into two compartments, one of which (designated 3) is adapted to contain water and to contain the eggs to be boiled, while the other (designated 4) contains the clockwork mechanism by means of which the latch is operated to release the lid and raise the eggs out of the water at the proper moment. This lid (designated 5) is hinged at one end, as shown at 6, to the end of the receptacle 1, and the lid carries a rod 7, that extends along the top of the lid and is secured thereto by ears 8 8, the rod having a depending end 9, which terminates in a laterally-extending lug 10, to which is attached a long spiral spring 11, the opposite end of which spring is attached at 12 to the side of the receptacle 1. The rod 7 extends beyond the free end of the lid and is arched, as at 13, so as to extend over an L-shaped plate 14, that is mounted on a stationary cover 15, that extends over that portion of the receptacle which contains the clockwork mechanism, said L-shaped plate serving to prevent any steam that may escape under the end of the lid from striking against the latch by which the lid is held closed and then condensing and running down into the mechanism by which said latch is operated. The lid 5 is provided with a pivoted latch 16, which may be engaged with a keeper 17, carried by the plate 14 when it is desired to keep the cover permanently closed, as when the apparatus is not in use. The end of the rod 7 beyond the arched portion 13 thereof extends horizontally above the cover 15, as shown at 18, and this extension of the rod is engaged during the time the eggs are being boiled by a latch 19, that is pivoted at 20 to a standard 21, carried by the frame of the clockwork mechanism.

The lid 5 carries a number of egg-holders on its lower side, each of these egg-holders consisting of a bent plate of spring metal 22, which is of substantially inverted-V shape and the depending legs of which are each formed with a hole 23, in which holes the eggs are adapted to be seated and to be held by the resiliency of the holders, as clearly indicated in Fig. 7 of the drawings.

An inclined trough 24 is fixed on the side of the receptacle 1, this trough serving to protect the spring 11 from the heat of the flame by which the receptacle is heated.

The compartment 4, in which the clockwork mechanism is contained, is provided with an end 25, and upon the outer side of this end is a scale 25', designating any desired number of minutes, the scale shown on the drawings embodying fifteen numbered divisions, each of which is a single minute—that is, each division represents one-sixtieth of a complete circle—the scale corresponding to the subdivisions on the dial of a clock.

The clockwork mechanism hereinbefore referred to is contained within the compartment 4 and is an ordinary clockwork, provided with the usual mainspring 26, a train of gearing 27, an escapement-wheel 28, an escapement-lever 29, and a balance-wheel 30, all these parts being constructed in the usual manner and not requiring specific description. The clockwork mechanism is sustained in a frame 31, and this frame carries a plate 32, upon which is formed the standard 21, hereinbefore referred to. A pin 33 projects from the plate 32, and upon this pin is suspended a swinging arm 34, which has its lower end beveled, as indicated at 35 in Fig. 8 of the drawings, such beveled end being adapted to contact with the pin 36, carried by the balance-wheel 30. A small spring 37 has one end attached to the pin 33 and the other end attached to the arm 34, the tendency of this spring being to throw the arm inwardly and toward the balance-wheel, and the arm 34 is normally held out of contact with the pin 36 on the balance-wheel by a pin 38, that is carried by the depending arm of the latch 19 and which projects through a slot 39 in the plate 32. The minute-hand arbor 40 of the clockwork mechanism projects through the cover 25 and carries hand 41, that extends to the scale 25', and the opposite end of the minute-hand arbor carries an arc-shaped plate 42, both the hand 41 and the plate 42 being fixed on the arbor, so that by turning the hand 41 the plate 42 will be turned through a corresponding arc. The lower end of the latch 19 is formed with a laterally-projecting lug 43, which when the lid of the receptacle is closed and the latch is in engagement with the extension 18 and the rod 7 bears against the convex edge of the arc-shaped plate 42, such engagement of the lug 43 and the arc-shaped plate 42 maintaining the latch in a vertical position, in which position it will hold the lid closed. When, however, the arc-shaped plate 42, moving in the direction of the arrow in Fig. 6, reaches a point when the lug 43 can pass off the plate, the lifting action of the extension 18 throws the latch 19 to one side, thereby releasing the lid and permitting the same to rise. The clockwork mechanism is provided with a winding-key 44, which is arranged on the mainspring-shaft and on the outside of the end 25, the mainspring-shaft projecting through said end.

The compartment 3 of the receptacle 1 is filled with water and placed on a stove or over a suitable burner, and the water is heated. The eggs to be boiled are placed in the holders 22 22 while the lid is in the elevated position, (shown in Fig. 3,) and the lid is then lowered, thus submerging the eggs in the water, and the extension 18 of the rod 7 is engaged under the shoulder of the latch 19. The hand 41 is then turned in the direction of the black arrow in Fig. 4 of the drawings to the point on the scale 25' which indicates the number of minutes the eggs are to be boiled. The turning of the hand 41 turns the arc-shaped plate 42 in the direction of the black arrow shown in Fig. 6, and the lug 43 of the latch is caused to bear against the convex edge of the plate. In this position of parts the pin 38, carried by the latch, sustains the arm 34 out of contact with the pin 36 on the balance-wheel, and the movement of the arm which has been produced by the movement of the latch in placing it in position gives the balance-wheel a slight swing, and on the return movement the pin 36 engages with the fork on the end of the escapement-lever 29 and starts the clockwork in motion, and this motion continues until the hand 41, carried by the minute-hand arbor, returns in the direction of the dotted arrow shown in Fig. 4 to the zero-point of the scale 25'. During this movement of the hand 41 the plate 42, being mounted on the minute-hand arbor, turns at the same rate, and consequently when the hand 41 reaches the zero-point of the scale 25' the upper straight edge of the arc-shaped plate 42 will reach a point below the bottom of the lug 43 and the latch 19 being no longer restrained in its movement will be swung away from the extension 18 of the rod 7 by the upward pressure of such extension, and the lid 5 and the receptacle will be thrown upwardly by the spring 11 into the position shown in Fig. 3 of the drawings and will remain in this position until the eggs have been taken out of the holders 22 22 and until the latch has been forcibly closed down as before. After the lid has raised in the manner above described the latch 19 will swing back into a vertical position, and the spring 33 will return the arm 34 to the position where it will engage the pin 36, carried by the balance-wheel 30, and will stop the clock, and the clock will not be again set in motion until the lid has been closed down as before and the arm 34 thrown out of engagement with the pin 36 on the balance-wheel.

Having described my invention, I claim—

1. In an apparatus of the character described, the combination of a receptacle for water, a lid hinged to said receptacle, a spring connected to said lid and to the receptacle, and adapted to open the lid, a rod carried by said lid, a clockwork mechanism arranged in the receptacle and including a minute-hand arbor and a balance-wheel, a latch pivotally mounted on the frame of the clockwork mechanism and adapted to engage said rod, an arc-shaped plate carried by the minute-hand arbor of the clockwork mechanism and adapted to engage said latch, a hand carried by the minute-hand arbor of the clockwork mechanism and adapted to indicate on a fixed scale the movement of said arbor, a swinging arm carried on the frame of the clockwork mechanism and adapted to engage the balance-wheel of said mechanism and a pin carried by said latch and adapted when the latch is engaged with said rod to throw said arm out of engagement with the balance-wheel.

2. In a device of the character described, a receptacle having a compartment to contain water, a spring-operated hinged lid covering said compartment, egg-holders carried by said lid, a latch adapted to maintain the lid in closed position, a projection on said latch, a clockwork mechanism including a minute-hand arbor, a plate carried by the minute-hand arbor of the clockwork mechanism and adapted to maintain the latch in engagement with the lid, a hand carried by the minute-hand arbor of the clockwork mechanism and adapted to indicate the movement of said arbor on a fixed scale and a movable arm adapted to engage a moving part of the clockwork mechanism, said arm being adapted to be engaged by the projection on said latch.

3. In a device of the character described, a receptacle adapted to contain water, a movable lid covering said receptacle, egg-holders carried by said lid, a latch adapted to maintain the lid in closed position, clockwork including an arbor mechanism, means carried thereby for holding the latch in engagement with the lid, means carried by the said arbor of the clockwork mechanism for setting said mechanism to run for a predetermined period, and means operable by said latch for stopping the clockwork mechanism when said period has elapsed.

In testimony whereof I affix my signature in the presence of two witnesses.

HORACE HASTINGS CHESBROUGH.

Witnesses:
 IRA M. BAIRD,
 GEO. W. OERTEL.